A. L. BAKER.
TIRE AND RIM.
APPLICATION FILED JULY 7, 1919.

1,335,268. Patented Mar. 30, 1920.

WITNESSES

INVENTOR
Alfred L. Baker.
BY
ATTORNEYS

UNITED STATES PATENT OFFICE.

ALFRED L. BAKER, OF JEROME, MICHIGAN.

TIRE AND RIM.

1,335,268.  Specification of Letters Patent.  Patented Mar. 30, 1920.

Application filed July 7, 1919. Serial No. 309,060.

*To all whom it may concern:*

Be it known that I, ALFRED L. BAKER, a citizen of the United States, residing at Jerome, in the county of Hillsdale and State of Michigan, have invented new and useful Improvements in Tires and Rims, of which the following is a specification.

This invention relates to pneumatic tires for motor vehicles and the like, and has for its object the provision of a peculiarly constructed tire and rim in which the tire includes an outer casing, an inflatable inner tube, and an auxiliary inner casing engaging the inner periphery of the tube and interengaged with the outer casing, the outer casing being engaged and held in position by a peculiarly constructed rim whereby all the parts will be firmly held associated and whereby a highly efficient and durable tire structure will be provided.

An important object is the provision of a tire of this character in which the structure is such that the sides of the rim extend throughout the major portions of the sides of the tire whereby to form a protection against scrubbing of the sides of the casing when running through ruts or the like, the point of engagement of the outer edge of the rim with the casing being so formed as to exclude dirt from entering between the casing and rim.

Figure 1:
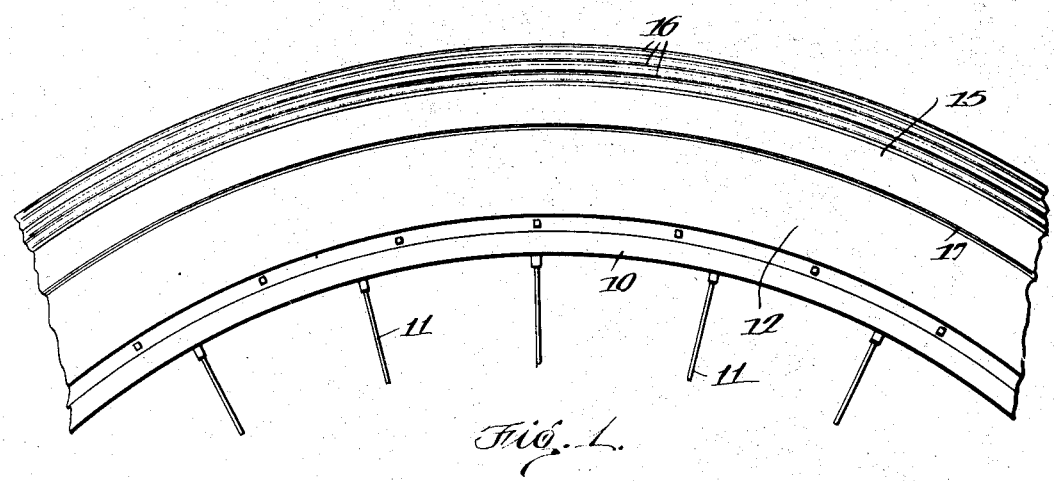
Figure 2:
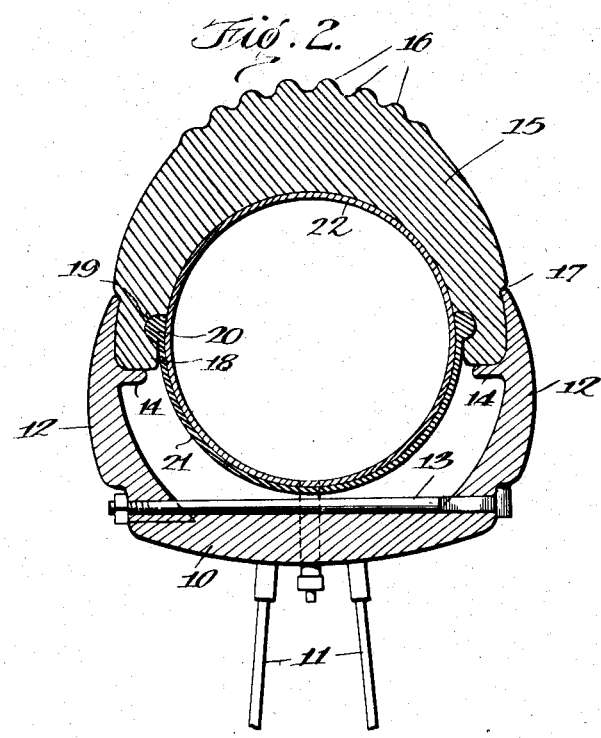

With the above and other objects and advantages in view, the invention consists in the details of construction to be hereinafter more fully described and claimed, and illustrated in the accompanying drawing, in which Figure 1 is a fragmentary side elevation of a tire and rim constructed in accordance with my invention, and Fig. 2 is a cross sectional view.

Referring more particularly to the drawing, the numeral 10 designates the peripheral portion of a wheel to which are connected the usual spokes 11 which may be wire, as shown, or wooden, if preferred. At its sides, the portion 10 of the rim is recessed for engagement of the rim flanges 12 which are detachable and which are held in place by means of suitable bolts 13 passing through the flanges 12. Intermediate their ends, the flanges have formed upon their confronting faces, ribs 14, for a purpose to be described.

The numeral 15 designates the tire casing which is formed preferably with a non-skid tread surface 16 and which is provided adjacent its edges with reduced portions 17 engaging against the outer edges of the flanges 12 whereby to make a close joint for the purpose of excluding dirt. The edges 18 of the casing engage against the ribs 14 of the flanges 12 and the inner walls of the casing adjacent the edge portion are provided with recesses 19 within which are engaged ribs 20 formed on the outer periphery of an inner casing 21 which engages the inner periphery of the inner tube which is designated by the numeral 22.

When the tire and rim are constructed and assembled as above described and as shown in the drawing, it will be seen that the flanges 12 of the rim will receive the brunt of any scrubbing action on the side of the tire and will consequently save the tire from wear or injury, as when running in frozen or sun baked ruts or the like. It will be observed that the ribs 14 on the rim flanges 12 will bear the weight and that the greater the pressure upon the tire the tighter will be the joint between the outer edges of the flanges 12 and the portions 17 of the casing so that no dirt or dust can possibly enter. Owing to the provision of the ribs 20 on the inner casing 21, it will be seen that the outer casing will be firmly urged against the rim flanges 12 and that displacement of the parts will be consequently prevented.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

In combination, a rim having side flanges provided upon their inner faces with circumferentially extending ribs, a casing engaged between said flanges and having its edges abuttingly engaging upon said ribs, said casing being provided at diametrically opposite points in its inner wall with circumferentially extending recess, an inner casing having its edges formed as beads engaged within said recesses, said inner casing extending toward the rim and defining with the inner wall of said first named casing a circumferential space circular in cross section, and an inflatable tube disposed between said first and second named casings.

ALFRED L. BAKER,